United States Patent
Alvanos

(10) Patent No.: US 8,899,924 B2
(45) Date of Patent: Dec. 2, 2014

(54) NON-MECHANICALLY FASTENED TOBI HEAT SHIELD

(75) Inventor: Ioannis Alvanos, West Springield, MA (US)

(73) Assignee: United Technologies Corporation, Hartford, CT (US)

( * ) Notice: Subject to any disclaimer, the term of this patent is extended or adjusted under 35 U.S.C. 154(b) by 665 days.

(21) Appl. No.: 13/164,234

(22) Filed: Jun. 20, 2011

(65) Prior Publication Data

US 2012/0321453 A1  Dec. 20, 2012

(51) Int. Cl.
*F04D 31/00* (2006.01)
*F01D 5/08* (2006.01)
*F02C 7/18* (2006.01)

(52) U.S. Cl.
CPC . *F01D 5/081* (2013.01); *F02C 7/18* (2013.01); *F05D 2260/30* (2013.01); *Y02T 50/676* (2013.01)
USPC .......................................... 416/116; 415/132

(58) Field of Classification Search
USPC ........ 415/115, 116, 134, 182.1, 213.1, 214.1, 415/232, 170.1
See application file for complete search history.

(56) References Cited

U.S. PATENT DOCUMENTS

| | | | |
|---|---|---|---|
| 4,526,511 A | | 7/1985 | Levine |
| 4,635,332 A | * | 1/1987 | Cederwall et al. ......... 29/889.22 |
| 4,645,415 A | * | 2/1987 | Hovan et al. .................. 415/115 |
| 4,822,244 A | | 4/1989 | Maier et al. |
| 5,233,824 A | * | 8/1993 | Clevenger ....................... 60/805 |
| 5,813,830 A | * | 9/1998 | Smith et al. ................ 415/170.1 |
| 6,183,193 B1 | | 2/2001 | Glasspoole et al. |
| 6,276,896 B1 | | 8/2001 | Burge et al. |
| 6,431,820 B1 | * | 8/2002 | Beacock et al. .................. 415/1 |
| 6,468,032 B2 | | 10/2002 | Patel |
| 6,511,284 B2 | | 1/2003 | Darnell et al. |
| 7,114,339 B2 | * | 10/2006 | Alvanos et al. ................. 60/806 |
| 7,174,719 B2 | * | 2/2007 | Kim ............................... 60/805 |
| 7,600,969 B2 | * | 10/2009 | Frankenstein et al. ........ 415/177 |
| 2002/0076318 A1 | | 6/2002 | Patel |
| 2005/0217277 A1 | * | 10/2005 | Alvanos et al. ................. 60/782 |
| 2006/0037317 A1 | * | 2/2006 | Leavesley ....................... 60/602 |
| 2007/0059158 A1 | | 3/2007 | Alvanos et al. |
| 2008/0141677 A1 | | 6/2008 | Brillert |
| 2009/0010751 A1 | | 1/2009 | McCaffrey et al. |
| 2009/0180864 A1 | | 7/2009 | Alvanos et al. |
| 2009/0238683 A1 | | 9/2009 | Alvanos et al. |

* cited by examiner

*Primary Examiner* — Edward Look
*Assistant Examiner* — William Grigos
(74) *Attorney, Agent, or Firm* — Kinney & Lange, P.A.

(57) ABSTRACT

A high pressure turbine includes a stator, a rotor, a tangential on-board injector, and a heat shield. The rotor is located downstream of the stator and the tangential on-board injector directs cooling air to the rotor. The heat shield is retained by abutment with the stator and the tangential on-board injector.

15 Claims, 4 Drawing Sheets

NON-MECHANICALLY FASTENED TOBI HEAT SHIELD

BACKGROUND

This invention relates generally to gas turbine engines, and more specifically to heat shields for tangential on-board injectors in high pressure turbines.

In a gas turbine engine, air is pressurized in a compressor and mixed with fuel in a combustor for generating hot combustion gases. The combustion gases pass across alternating rows of stationary stator vanes and rotating rotor blades in one or more turbines to produce to both power for the compressor and usable work (e.g. thrust in an aircraft). Gas turbine engine efficiency and energy output increase with turbine operating temperature. Under elevated operating temperatures, turbine vanes and blades are cooled by a flow of air from the compressor. The flow of compressed, cooling air is typically introduced to the turbine through a tangential on-board injector (TOBI).

SUMMARY

In accordance with the present disclosure, a high pressure turbine includes a stator, a rotor, a tangential on-board injector, and a heat shield. The rotor is located downstream of the stator, and the tangential on-board injector directs cooling air to the rotor. The heat shield is retained by abutment with the stator and the tangential on-board injector.

In another embodiment, the stator includes a vane and an inward platform attached to the vane. The rotor includes a blade, an inward root attached to the blade, and an inward disk attached to the root. The tangential on-board injector includes a conduit for directing cooling airflow toward the rotor disk, and an arm extending radially outward from the conduit toward the rotor root. The heat shield is retained by abutment with the platform of the stator and the arm of the tangential on-board injector.

A method for securing a heat shield in a high pressure turbine in accordance with the present disclosure includes inserting the heat shield between a stator and a tangential on-board injector. The method further includes radially retaining the heat shield with the stator, and axially retaining the heat shield with the tangential on-board injector.

DETAILED DESCRIPTION

Figure 1:
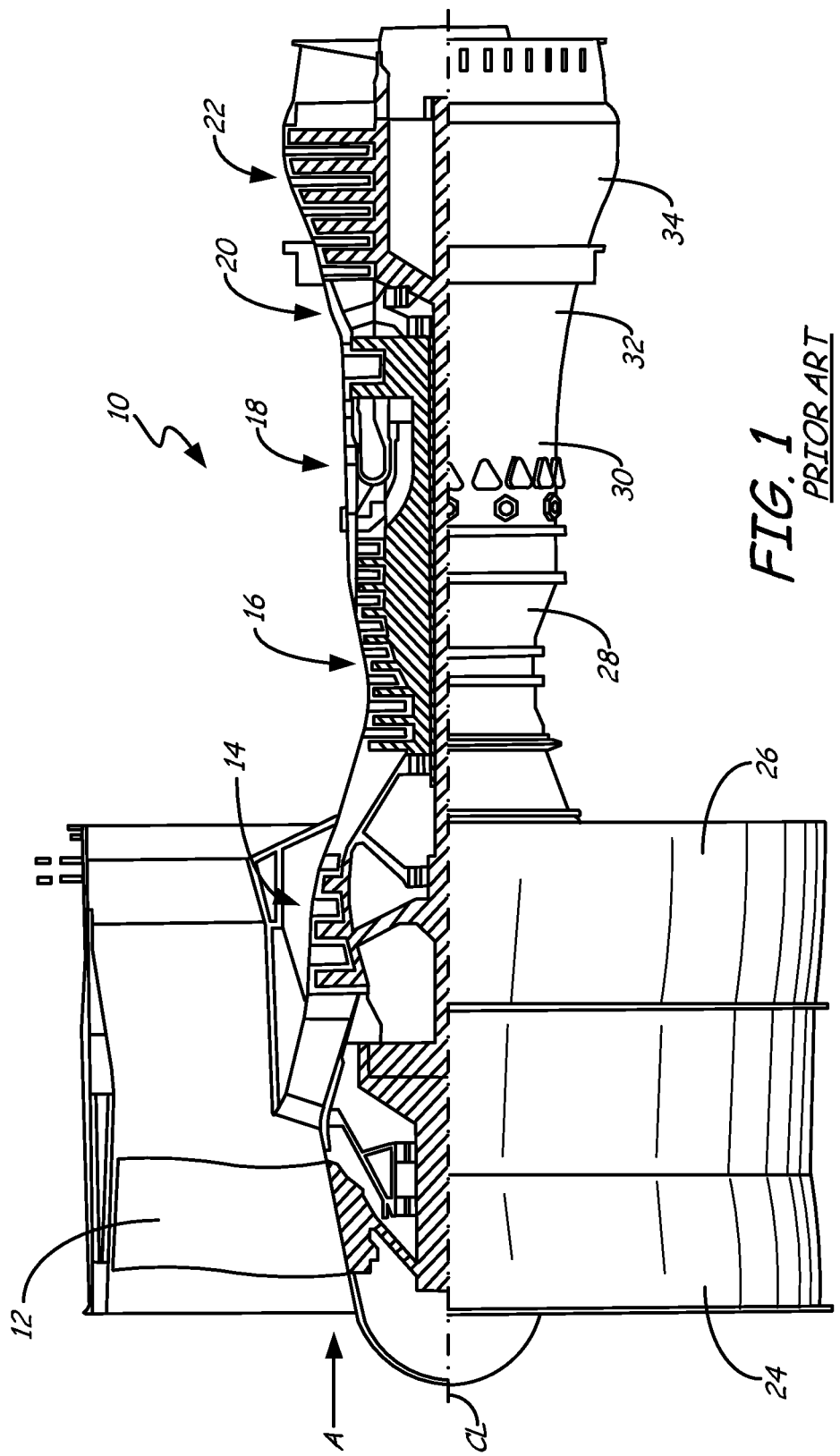
FIG. 1 is a cross sectional view of a gas turbine engine in accordance with the prior art.

FIG. 1 is a cross sectional view of gas turbine engine 10 in accordance with the prior art. Gas turbine engine 10 includes fan 12, low pressure compressor (LPC) 14, high pressure compressor (HPC) 16, combustor 18, high pressure turbine (HPT) 20, and low pressure turbine (LPT) 22, which are each concentrically disposed around longitudinal engine centerline (CL). Fan 12 is enclosed at its outer diameter within fan case 24. Likewise, the other engine components are enclosed at their outer diameters within various engine casings, including LPC case 26, HPC case 28, combustor case 30, HPT case 32 and LPT case 34.

As shown in FIG. 1, fan 12, LPC 14, HPC 16, combustor 18, HPT 20, and LPT 22 are located in flow series within gas turbine engine 10. Ambient air A enters fan 12, is directed first into LPC 14, and then into high pressure compressor HPC 16. LPC 14 and HPC 16 work together to increase pressure of ambient air A, thereby forming compressed air. The compressed air is delivered to combustor 18, mixed with fuel, and burned to produce high energy combustion gases or "working gases" (WG). Working Gases (WG) are expanded by high pressure turbine HPT 20 and low pressure turbine 22 to produce power for HPC 16 and LPC 14, as well as usable work, such as thrust for an aircraft.

Figure 2:
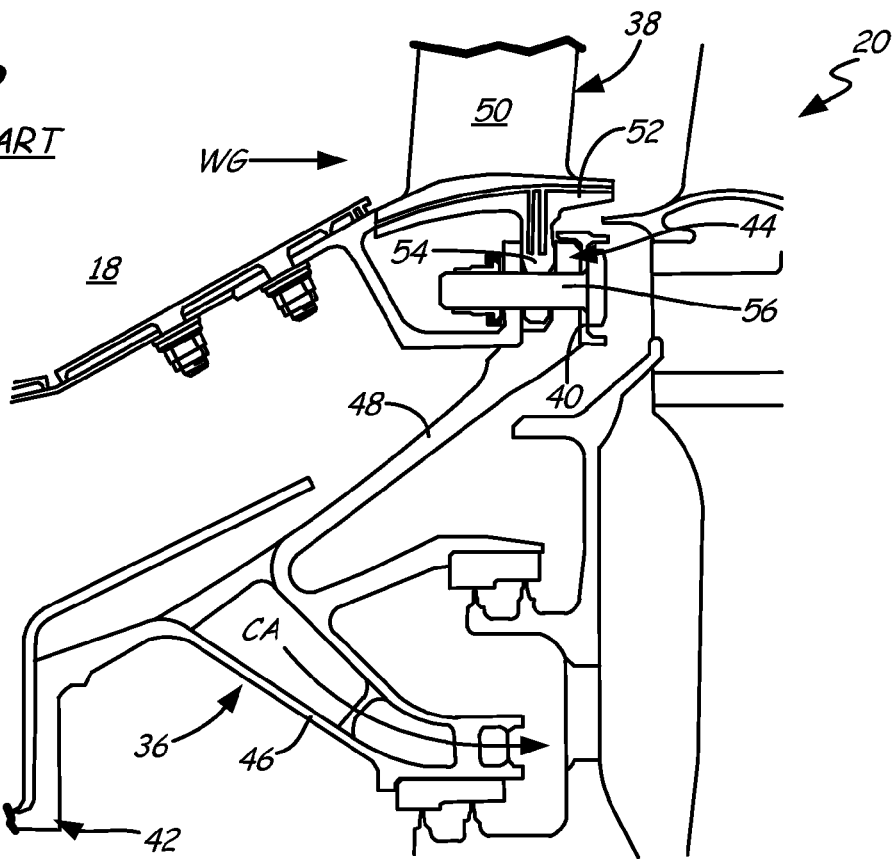
FIG. 2 is an assembled cross sectional view of a tangential on-board injector, stator, and heat shield in a high pressure turbine in accordance with the prior art.
Figure 3:
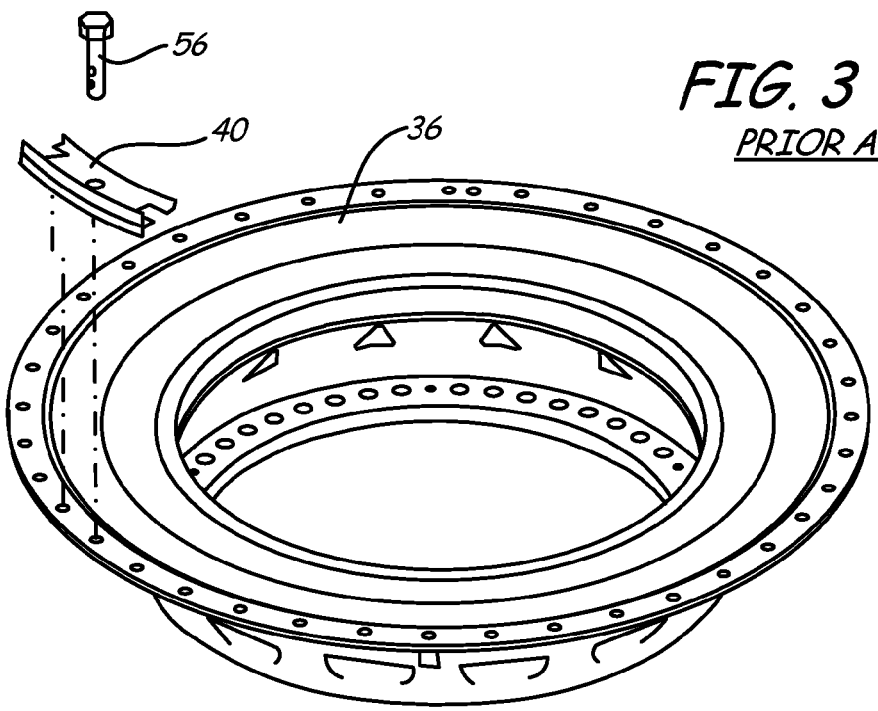
FIG. 3 is an exploded perspective view of the heat shield and the tangential on-board injector from FIG. 2.

FIG. 2 is an assembled cross sectional view of tangential on-board injector (TOBI) 36, stator 38, and heat shield 40 in high pressure turbine (HPT) 20 in accordance with the prior art. FIG. 3 is an exploded perspective view of showing the attachment of heat shield 40 to TOBI 36. Depicted in FIG. 2 are combustor 18, HPT 20, TOBI 36, stator 38, and heat shield 40. TOBI includes inner diameter (ID) 42, outer diameter (OD) 44, conduit 46, and arm 48. Stator 38 includes airfoils 50, platform 52, and flange 54. Depicted in FIGS. 2 and 3 are fastener 56, which mechanically attaches heat shield 40 to TOBI 36 in order to minimize thermal mechanical fatigue.

As described above with respect to FIG. 1, combustor 18 is located upstream of HPT 20 such that combustion or working gases (WG) are delivered from combustor 18 to HPT 20 for expansion. Working Gases (WG) flow by first stage stator assembly (stator) 38 and then alternately encounter rotors and further stators as Working Gases (WG) pass through HPT 20. TOBI 36 is an annular structure located radially inward of Working Gases (WG), toward the centerline (CL) of engine 10. Heat shield 40 is attached to an axially downstream and radially outward portion of TOBI 36, as well as an axially downstream and radially inward portion of stator 38. ID 42 is the most radially inward portion of TOBI 36 and therefore, is located toward centerline (CL) of engine 10. From ID 42, TOBI 36 extends axially downstream and radially outward to OD 44, which is the most radially outward portion of TOBI 36. Conduit 46 is located between ID 42 and OD 44 and extends axially downstream and radially inward to direct a flow of Cooling Air (CA) from HPC 16 to portions of HPT 20. Arm 48 is located between conduit 46 and OD 44 and extends axially downstream and radially outward toward stator 38. Stator 38 includes airfoils 50, radially inward platform 52, and radially inward flange 54. Flange 54 extends radially inward from platform 52 toward OD 44 of TOBI 36. Fastener 56 (i.e. bolt, rivet, screw, etc.) mechanically attaches heat shield 40 to TOBI 36 and stator 38. More specifically, fastener 56 is inserted, from downstream to upstream, through heat shield 40, ID 44 of TOBI 36, and flange 54 of stator 38, where it is secured with a bolt or nut 56.

Figure 5:
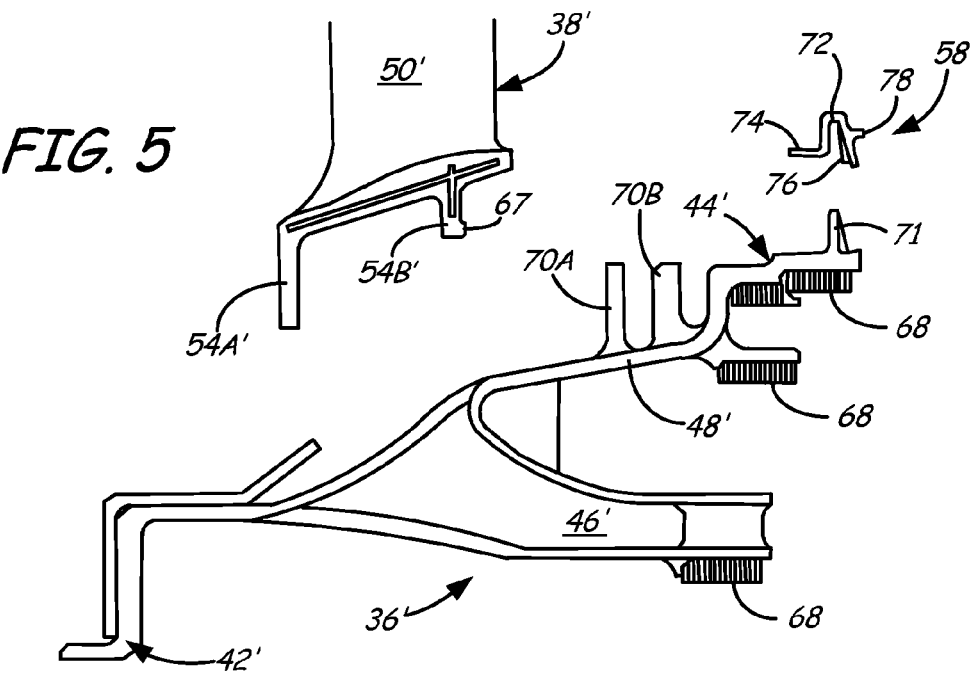
FIG. 5 is an exploded cross sectional view of the tangential on-board injector, the stator, and the heat shield from FIG. 4.

Working Gases (WG) flowing from combustor 18 to HPT 20 are very hot. Although TOBI 36 is not in the direct flow path of Working Gases (WG), OD 44 is adjacent stator 38 therefore, becomes extremely hot. ID 42 of TOBI 36, however, is relatively cool since conduit 46 directs Cooling Air (CA) toward the rotors. Accordingly, TOBI 36 faces a very large thermal gradient between OD 44 and ID 42. Heat shield 40 is attached to OD 44 of TOBI 36 to prevent thermal cracking from thermal mechanical failure. Further, heat shield 40 is designed to help minimize Working Gases (WG) from mixing with (CA), through the use of a flow discourage 78 as shown in FIG. 5. As shown in FIG. 3, heat shield 40 is segmented and attached in pieces around annular TOBI 36 by mechanical fastener 56. As engine 10 core size is reduced, the amount of space or "real estate" available for heat shield 40 and fastener 56 is reduced. Further, fastener 56 does not scale well with reductions in engine 10 core size and adds additional mass and weight.

Figure 4:
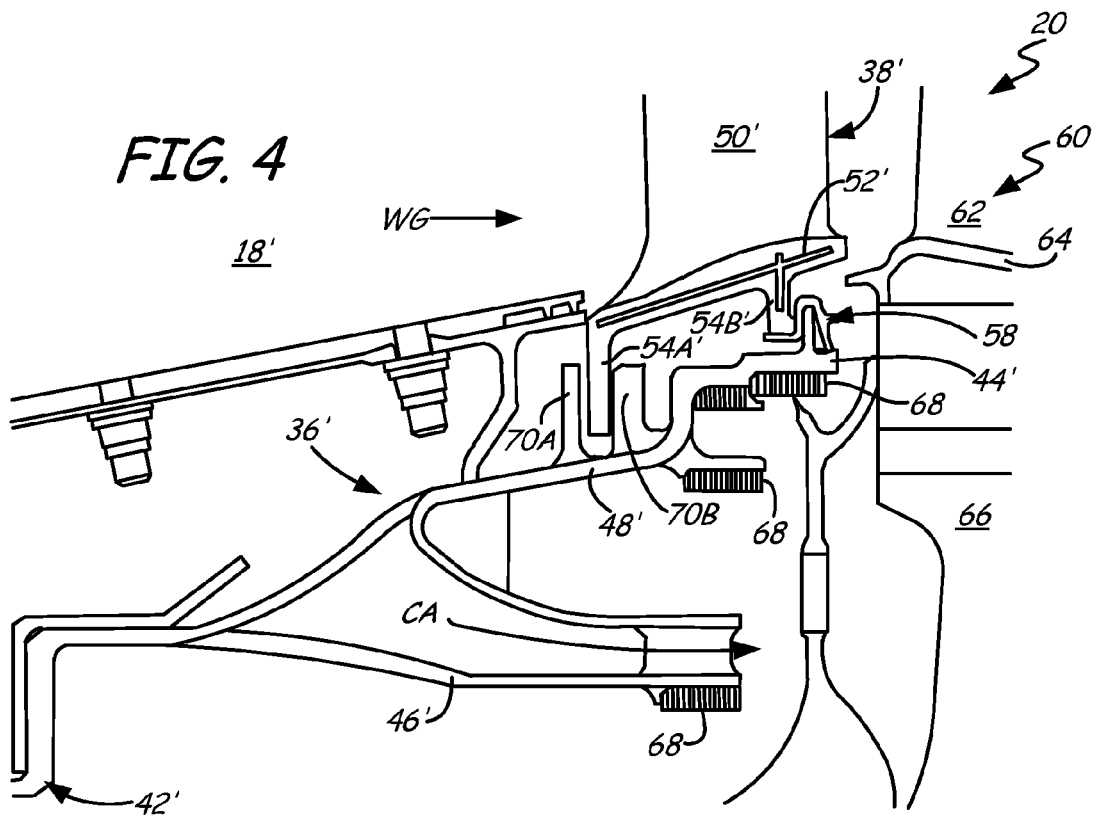
FIG. 4 is an assembled cross sectional view of a tangential on-board injector, a stator, and a heat shield in accordance with the present disclosure.

FIG. 4 is an assembled cross sectional view, and FIG. 5 is an exploded cross sectional view showing components not visible in FIG. 4, of tangential on-board injector (TOBI) 36', stator 38', and heat shield 58 in accordance with the present disclosure. Depicted in FIG. 4 are combustor 18', HPT 20', TOBI 36', stator 38', heat shield 58, and rotor 60. TOBI includes inner diameter (ID) 42', outer diameter (OD) 44', conduit 46', and arm 48'. Stator 38' includes airfoils 50', platform 52', and flanges 54A' & 54B'. Rotor includes blade 62, root 64, and disk 66. More visible in the exploded view of FIG. 5 are several subcomponents: foot 67 of flange 54B'; seals 68, flanges 70A & 70B, and finger 71, of TOBI 36'; and body 72, appendage 74, anti-rotation feature 76, and flow discourager 78 of heat shield 58. Heat shield 58 is retained solely by abutment between TOBI 36' and stator 38' thereby negating the need for a mechanical fastener (shown in FIGS. 2 & 3 as reference numeral 56).

TOBI 36' and stator 38' of FIGS. 4-5 share characteristics with TOBI 36 and stator 38 of FIGS. 2-3, and like reference numerals designate like components. Working Gases (WG) flow by first stage stator assembly (stator) 38', first stage rotor assembly (rotor) 60, and then alternately encounter further stators and rotors as Working Gases (WG) pass through HPT 20'. Stator 38' includes airfoils 50', which is attached at its radially inner surface to platform 52'. Projecting radially inward from platform 52' are flanges 54A' and 54B'. First flange 54A' is attached to an axially upstream edge of platform 52'. Second flange 54B' is located downstream of first flange 54A', but upstream of a downstream edge of platform 52'. As shown in FIG. 5, foot 67 extends upstream from a radially inner tip of second flange 54B'.

TOBI 36' includes arm 48', which extends from ID 42' radially outward and axially downstream to OD 44'. Conduit 46' is attached to arm 48' at a location between ID 42' and OD 44' and extends axially downstream in order to conduct Cooling Air (CA) to components of HPT 20'. In the depicted embodiment, conduit 46' imparts tangential motion in Cooling Air (CA) before directing Cooling Air (CA) to disk 66 of rotor 60. Attached to axially downstream and radially inner surfaces of conduit 46', arm 48', and OD 44' are abradable seals 68. Attached to a middle portion of arm 48', between conduit 46' and OD 44', are flanges 70A and 70B. First flange 70A is located upstream on arm 48' and extends radially outward toward stator 38'. Second flange 70B is located downstream on arm 48' and extends radially outward toward stator 38', substantially parallel to first flange 70A. Finger 71 is attached to the downstream edge of OD 44'. From its attachment to OD 44', finger 71 projects radially outward toward stator 38'. First flange 54A' of stator 38' is received between first flange 70A and second flange 70B of TOBI 36'. Second flange 54B' and foot 67 of stator 38' cooperate with OD 44' and finger 71 of TOBI 36' to trap or "sandwich" heat shield 58 in place.

Heat shield 58 includes body 72, appendage 74, anti-rotation feature 76, and flow discourager 78. Appendage 74 projects axially upstream from its attachment to an upstream portion and radially inward side of body 72. Anti-rotation feature 76 is attached along, and projects radially upstream from, a downstream portion of body 72. Flow discourager 78 is attached to, and projects radially downstream from, the downstream potion of body 72. The structure of heat shield 58 is discussed further below with respect to FIGS. 6 & 7.

When correctly inserted between stator 38' and TOBI 36', heat shield 58 is retained solely by abutment with these structures, thereby negating the need a mechanical fastener (shown in FIGS. 2 & 3 as reference numeral 56). The upstream portion of body 72 and radially outer surface of appendage 74 are in contact with a downstream portion of foot 67 and radially inner surface of second flange 54B', respectively. Body 72 is curved to form an internal cavity, which surrounds and receives finger 71 of TOBI 36'. A radially inner surface of the upstream portion of body 72 contacts an upstream side of finger 71. A downstream side of anti-rotation feature 76 contacts an upstream side of finger 71. Flow discourager 78 extends from the downstream portion of body 72 and into a space formed between stator 38 and rotor 60 in order to discourage any Working Gases (WG) from mixing with Cooling Air (CA). Heat shield 58 is radially retained by its interface with stator 38'. More specifically, the interaction between body 72/appendage 74 and foot 67/second flange 54B'discourages heat shield 58 from moving radially. Heat shield 58 is axially retained by its interface with TOBI 36'. More specifically, the interaction between body 72/anti-rotation feature 76 and finger 71/OD 44 discourages heat shield 58 from moving axially. Further, the interface of anti-rotation feature 76 and finger 71/OD 44 discourages circumfrential migration of heat shield 58. Additional circumferential constraint is provided by stator 38'. Accordingly, heat shield 58 is retained by abutment with features on stator 38' and TOBI 36'. Since heat shield 58 does not require mechanical fasteners, weight and space needed in HPT 20 of engine 10 for heat shield 58 are reduced.

Figure 6:
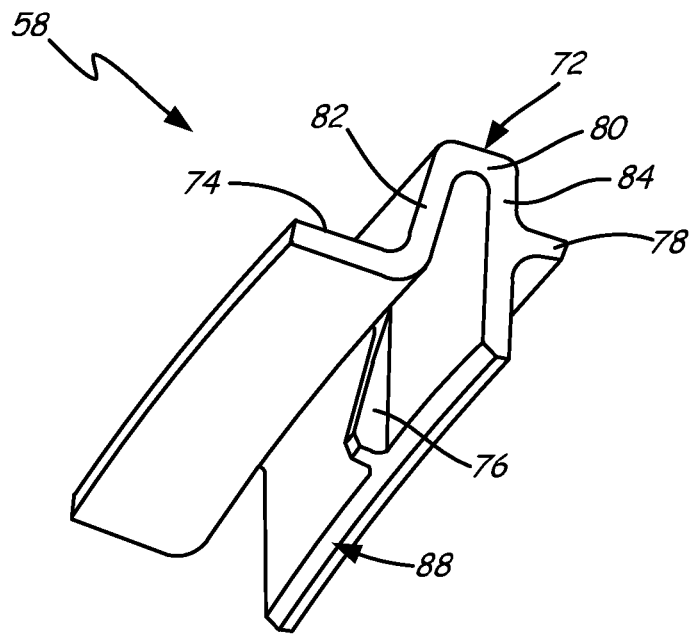
FIG. 6 is a bottom perspective view of the heat shield from FIGS. 4 and 5.
Figure 7:
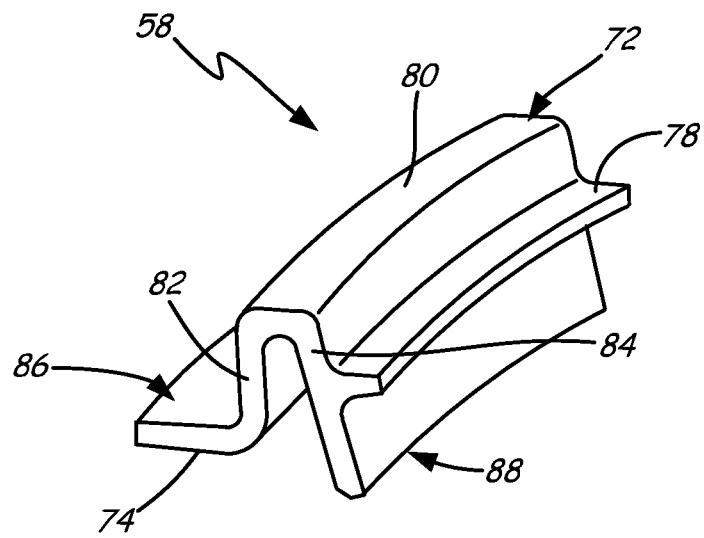
FIG. 7 is a top perspective view of the heat shield from FIGS. 4-6.

FIG. 6 is a bottom perspective view, and FIG. 7 is a top perspective view, of heat shield 58. Shown in FIGS. 6 and 7 are the components of heat shield 58: body 72, appendage 74, anti-rotation feature 76, and flow discourager 78. Also shown are the subcomponents of heat shield 58: center 80, upstream arm 82, and downstream arm 84 of body 72, includes top surface 86 of appendage 74, and bottom surface 88 of downstream arm 84. As described above, the structure of heat shield 58 is designed to be constrained between stator 38 and TOBI 36.

Body 72 is generally shaped like an inverted letter "U" and includes center 80, upstream arm 82, and downstream arm 84. Upstream arm 82 extends radially inward from an upstream side of center 80, and downstream arm 84 extends radially inward from a downstream side of center 80. Upstream arm 82 and downstream arm 84 are substantially parallel to one another on either side of center 80 to form an internal cavity in body 72. Appendage 74 is relatively flat and extends downstream from a radially innermost portion of upstream arm 82. When properly inserted, upper surface 86 of appendage 74 will be in contact second flange 54B' of stator 38', and upstream arm 82 of body 72 will be in contact with foot 67 of second flange 54B'. The radially innermost portion of downstream arm 84 includes an angled bottom surface 88. When properly inserted, bottom surface 88 will be in contact with a downstream portion of OD 44'. Anti-rotation feature 76 is generally shaped like a wedge and is attached along an upstream surface of downstream arm 84. The narrowest portion of anti-rotation feature 76 is near center 80 of body 72. As anti-rotation feature 76 extends radially inwardly along upstream arm 84 it also becomes enlarged such that the widest portion is adjacent bottom surface 88. When properly inserted, anti-rotation feature 76 is in contact with an upstream side of finger 71. Additional anti-rotation features and seals can be added onto heat shield 58 to meet requirements of a particular engine without departing from the spirit and scope of the present disclosure. Heat shield 58 is segmented and is intended to be secured, constrained, and held in place solely by abutment between TOBI 36' and stator 38' without use of mechanical fasteners.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A high pressure turbine comprising:
   a stator;
   a rotor located downstream of the stator;
   a tangential on-board injector for directing cooling air to the rotor; and
   a heat shield retained by abutment with the stator and the tangential on-board injector;
   wherein the heat shield includes an anti-rotation flange that abuts the tangential on-board injector and provides circumferential constraint for the heat shield.

2. The high pressure turbine of claim 1, wherein a portion of the heat shield is trapped or sandwiched between the stator and the tangential on-board injector.

3. The high pressure turbine of claim 1, wherein the heat shield is radially retained by the stator.

4. The high pressure turbine of claim 3, wherein an upstream portion of the heat shield abuts a radially inward portion of stator.

5. The high pressure turbine of claim 1, wherein the heat shield is axially retained by the tangential on-board injector.

6. The high pressure turbine of claim 5, wherein a downstream portion of the heat shield abuts a radially outer portion of the tangential on-board injector.

7. The high pressure turbine of claim 1, wherein a downstream portion of the heat shield extends into a gap formed between the stator and the rotor to discourage fluid flow within the gap.

8. A high pressure turbine comprising:
   a stator including a vane and an inward platform attached to the vane;
   a rotor located downstream of the stator, the rotor including a blade, an inward root attached to the blade, and an inward disk attached to the root;
   a tangential on-board injector including a conduit for directing cooling airflow toward the rotor disk and an arm extending radially outward from the conduit toward the rotor root; and
   a heat shield retained by abutment with the platform of the stator and the arm of the tangential on-board injector.

9. The high pressure turbine of claim 8, wherein a portion of the heat shield is located between the stator and the tangential on-board injector.

10. The high pressure turbine of claim 8, wherein the stator further comprises:
    a foot extending radially inward from the platform to radially retain the heat shield.

11. The high pressure turbine of claim 8, wherein the tangential on-board injector further comprises:
    a finger extending radially outward from the tangential on-board injector arm to axially retain the heat shield.

12. The high pressure turbine of claim 8, wherein the heat shield includes an anti- rotation flange that abuts the tangential on-board injector and provides circumferential constraint for the heat shield.

13. The high pressure turbine of claim 8, wherein the heat shield extends into a gap formed between the stator and the rotor and at least partially blocks fluid flow within the gap.

14. A method for securing a heat shield in a high pressure turbine, the method comprising:
    inserting the heat shield between a stator and a tangential on-board injector;
    radially retaining the heat shield with the stator;
    axially retaining the heat shield with the tangential on-board injector; and
    circumferentially retaining the heat shield with an anti-rotation feature on the heat shield in abutment with the tangential on-board injector.

15. The method of claim 14, further comprising:
    discouraging flow in a gap between the stator and a downstream rotor with the heat shield.

* * * * *

UNITED STATES PATENT AND TRADEMARK OFFICE
CERTIFICATE OF CORRECTION

| | |
|---|---|
| PATENT NO. | : 8,899,924 B2 |
| APPLICATION NO. | : 13/164234 |
| DATED | : December 2, 2014 |
| INVENTOR(S) | : Ioannis Alvanos |

It is certified that error appears in the above-identified patent and that said Letters Patent is hereby corrected as shown below:

In the Specification

Col. 4, Line 25
Insert --[space]-- between 54B' and discourages

Col. 4, Line 30
Delete "circumfrential"
Insert --circumferential--

Signed and Sealed this
Twenty-fourth Day of March, 2015

Michelle K. Lee
*Director of the United States Patent and Trademark Office*